Jan. 19, 1954     O. A. KNOPP     2,666,895
METHOD OF AND APPARATUS FOR THE CALIBRATION
OF INSTRUMENT CURRENT TRANSFORMERS
Filed Sept. 26, 1945     4 Sheets-Sheet 2

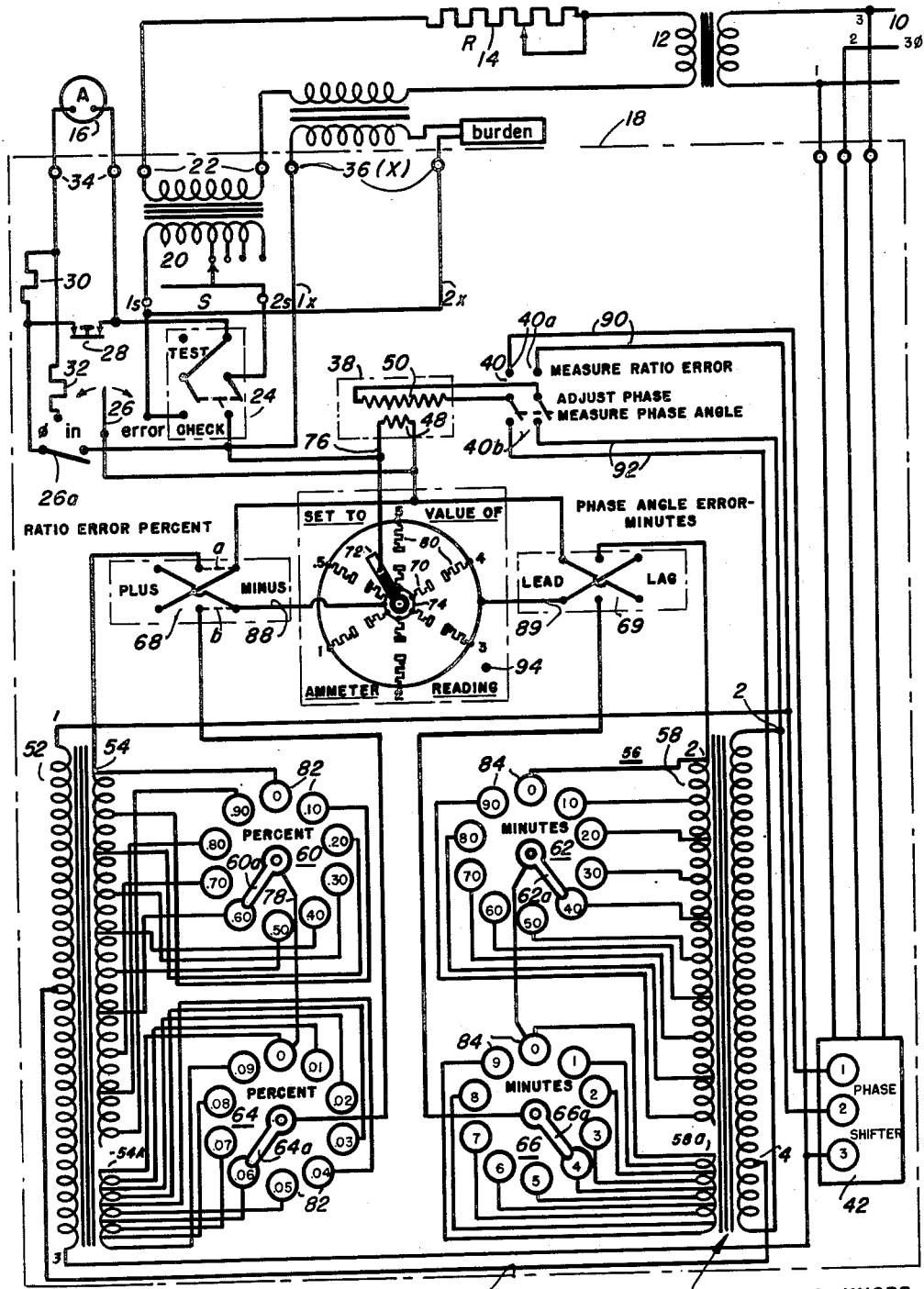
FIG. I

| FIG. 4A SWITCH | OHMS | FIG. 4B SWITCH |
|---|---|---|
| A | 10000 | A, B |
| B | 5000 | B, D |
| C | 2500 | A, C |
| D | 1250 | E, D |
| B, C | 1666 2/3 | B, C, D |
| D, B | 1000 | B, D, E |

OTTO A. KNOPP
Inventor

Ernie H. Johnson
Attorney

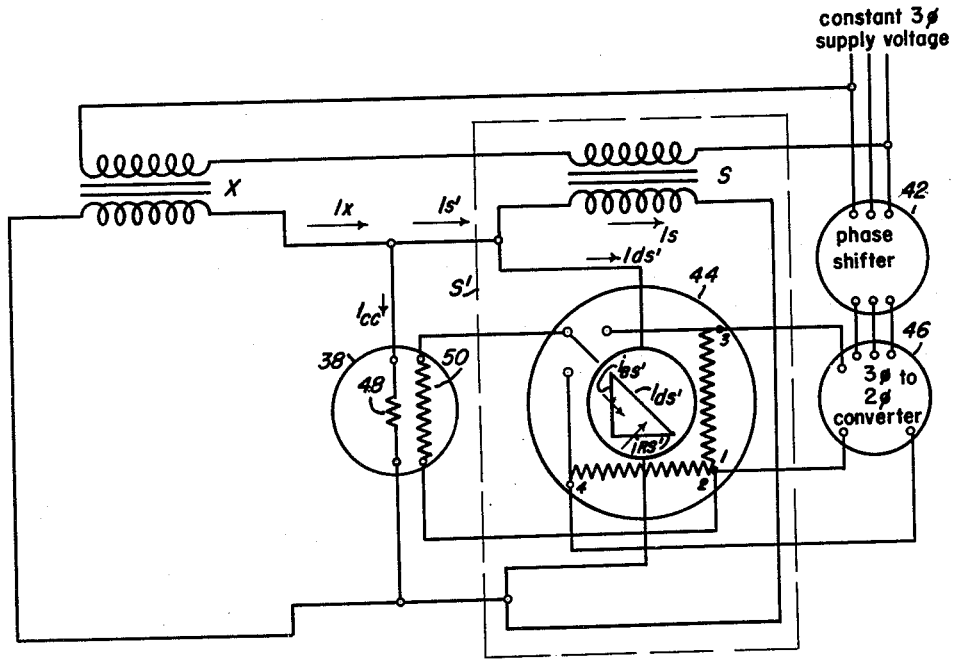
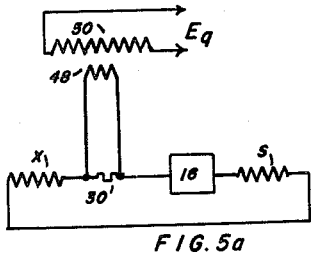
FIG. 5a
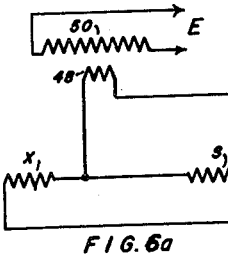
FIG. 6a
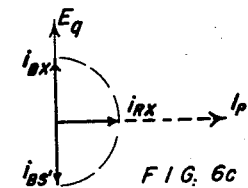
FIG. 6c
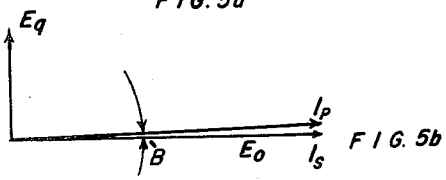
FIG. 5b
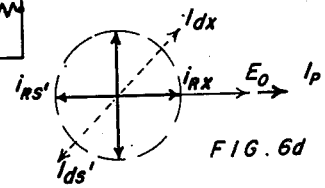
FIG. 6d
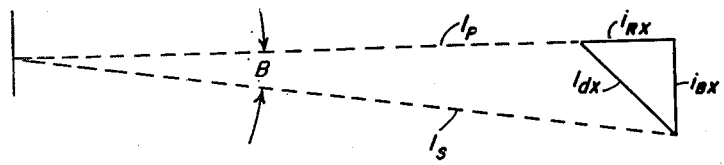
FIG. 6b
OTTO A. KNOPP
Inventor

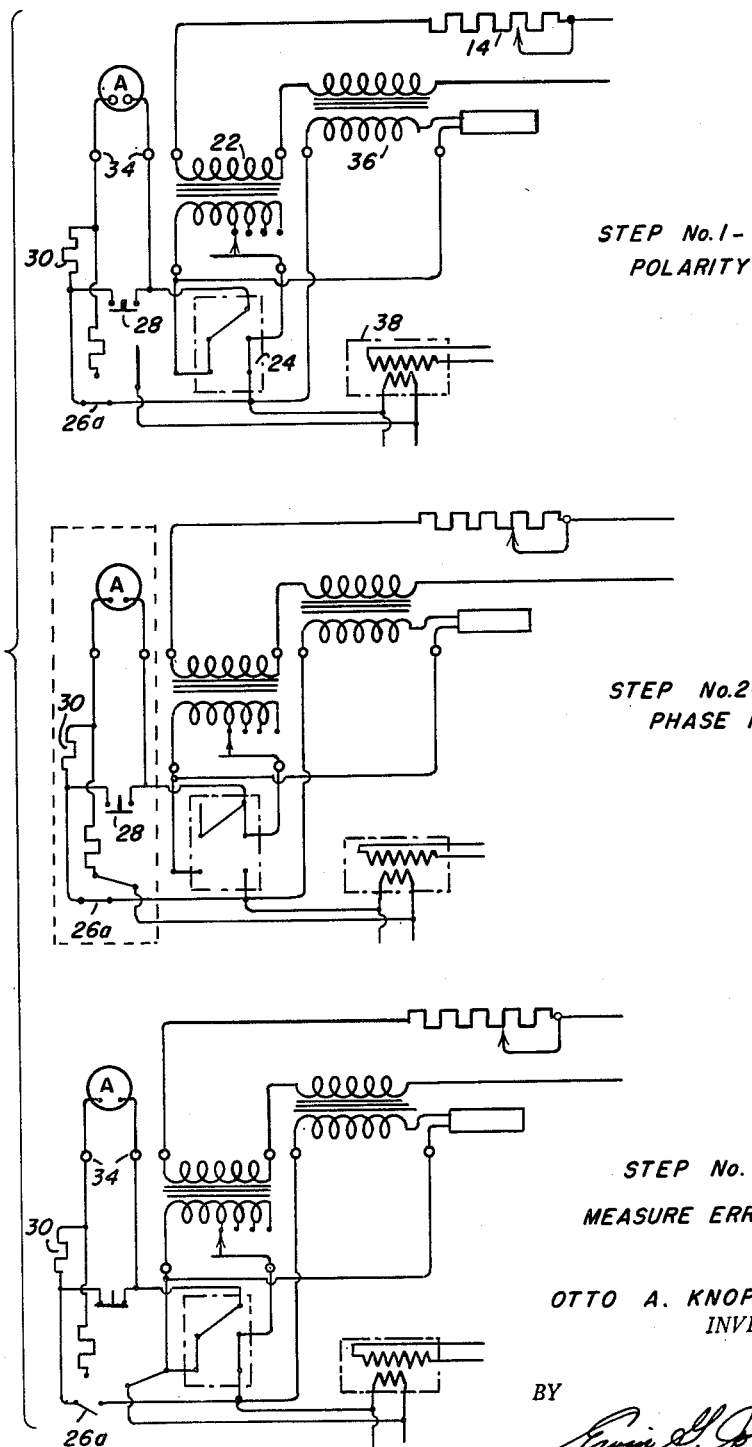

Patented Jan. 19, 1954

2,666,895

UNITED STATES PATENT OFFICE 2,666,895

METHOD OF AND APPARATUS FOR THE CALIBRATION OF INSTRUMENT CURRENT TRANSFORMERS

Otto A. Knopp, Oakland, Calif., assignor, by decree of distribution, to Louise B. Knopp Application September 26, 1945, Serial No. 618,743

31 Claims. (Cl. 324—55)

This invention relates to methods of and apparatus for the determination of the performance characteristics of electrical transformers such as instrument and relay transformers, but more particularly to the method and apparatus as herein described and illustrated as applied to the testing or checking of instrument current transformers.

It is a primary purpose of this invention to deal with current transformers, inasmuch as it finds its greatest application in this field. However, it will be evident to those skilled in the art that the present invention may be applied to transformers in general for purposes similar to those set forth herein. Moreover the applicability to the principles hereof to the measurements of other electrical apparatus characteristics will be evident to those skilled in the art, whether pointed out herein or not; it being understood that the invention is not limited by the subjects to which it is herein illustrated as applied.

Instrument transformers in general practice are designed for a nominal ratio termed the "marked" ratio by which name and marking they are identified and selected for some particular range of duty as a current transformer having a marked ratio of 200/5 operates in a range of primary currents below the 200 amperes value and the secondary operates in a range below 5 amperes. It is observed that the marked ratio value is an integer; in this case, the ratio is 40. In practice, however, the ratio is marked 200/5 because thereby it is known what the actual value of primary current is that may safely be applied to the primary without overloading the secondary circuit and apparatus. In general, however, the design of the transformer does not include an attempt to precisely fix the true ratio of transformation at a whole number because, inherently, the ratio even though a whole number under certain conditions and at a certain value of primary current, varies substantially under other conditions and at other values of primary current which variation cannot be eliminated in general practice. Such variations are imposed by variable apparatus and circuit conditions with which the transformer is associated as well as by limitations of the transformer itself, and since the transformer is called upon to serve under such variable conditions and to provide for accurate measurement of energy factors under all circumstances within its capabilities, provision must be made for accurately interpreting the behavior of the transformer so that its performance provides accurate information as to the energy condition in the primary circuit.

The provisions that are made for accurately interpreting the performance of the secondary circuit of a transformer so as to determine therefrom precisely what has transpired in the primary circuit with which it is linked, include the accurate determination of the true ratio for each of the values of primary current in the range of primary currents to be applied to the transformer. Transformer secondary burden, which is the impedance offered by the various elements, including conductors, instruments, and the like necessary to the performance of the measuring apparatus, produces an effect on the ratio which also varies as the load varies. This burden is likely to be varied by the user, because interested in making various connections and/or using instruments having different impedance. Accordingly, determinations of ratio are made for a transformer for each of one or more burdens to which the transformer may be applied so that, subsequently, the user may select a burden suited to the accuracy required in the range of currents over which the primary circuit energy is to be measured. These determinations, which form a part of the subject of this invention, are usually made throughout the range of the primary currents for which the transformer is intended, and in addition is made to include currents beyond the range thereof to give information of the degree of non-linearity of true ratio and phase angle changes outside the proper range of application of currents. This is because, among other considerations, current transformers are individual in respect of the manner in which their ratios and phase angles change as the primary currents and burdens change; thus, while the true ratio of one design of transformer may actually be constant throughout the range 150 to 200 amperes for which it is intended to be applied, transformers of another design in general have substantial variations in their true ratios even though calculated for the range 150 to 200 amperes and may be selected by the user for operation in a range wherein the ratio does not depart more than a certain tolerable percentage from a fixed value of ratio or from the marked ratio. Thus, practical use is made of a transformer whose true ratio of transformation varies throughout the range 150 to 200 amperes primary current so long as such variation is permissible. Therefore, in order to provide for making intelligent selection of transformers for a particular service, accuracy determinations are made for the ranges and are translated into the form of graphical curves, such as illustrated in Figure 2A, the curves A, B, and C of which are for different burdens.

Phase angle of a current transformer is affected by the burden referred to above, and likewise varies with the primary current. Because its presence is a source of errors in power measurements, the possibility of such errors must be avoided and such avoidance is made possible by the determination of phase angle for the complete range of primary currents and for each of several burdens probably to be employed in the use of the instrument transformer. A typical set of curves of phase angle variations with burden is illustrated in Figure 2B.

The ratio and phase angle determinations form the subject matter of this invention. The determination of these factors involves not only the factors which affect the performance of a particular instrument transformer which has individual characteristics of its own, but involves the characteristics of all transformers to which similar determinations are applicable. It seems obvious that the greater the range of types of instrument transformers to which a method of and apparatus for determination of ratio and phase angle are applicable, the greater its relative economy and efficiency.

It is pointed out elsewhere in this specification that the multiple-range standardizing transformer I have developed is designed so that, when operated under conditions of zero burden, the errors are constant for all ranges, that is to say, the ratio error curves are the same for all ranges, and the phase angle error likewise the same (within tolerable limits) for all ranges. I have found that this transformer can be constructed for operation so that the true ratio of the transformer when operating with zero burden is substantially equal to the marked or nominal ratio of the transformer. that is. so that the ratio correction factor is substantially unity for all ranges, at all values of the primary current and ratios of transformation, and the transformer may further be constructed so that when operating under zero burden, the phase angle of the instrument transformer is substantially zero at all values of the primary current and ratio of transformation. Accordingly, when so designed for an acceptable degree of accuracy, the standard multiple-range transformer has zero ratio error and zero phase angle error, for all ratios and all values of primary currents used in testing. Accordingly when used in connection with the detector wattmeter in accordance with my methods, no arithmetical additions or subtractions are necessary. This transformer I term a zero-error, zero-burden, multiple range current transformer standard.

By the methods of this invention calculations of any kind are avoided in the making of calibration curves, the methods and apparatus being so employed and arranged that, through pure manipulation and observation. the phase angle correction and the ratio correction are directly readable from dial settings when the method is practiced on the apparatus. This is a substantial advantage in commercial testing and calibration practice because the speed of routine testing is greatly increased and the skill required of persons employed in its practice is largely reduced because an understanding of the effects of the simple steps employed in applying the method is eliminated as a requirement. By the employment of the apparatus, that is, by setting certain steps of procedure to be followed by the operator, the required accuracy and correctness of operation as well as the right answers may be obtained by persons otherwise unskilled in the art.

In the employment of this invention the detector, while of a type similar or identical to wattmeters used for detectors in prior methods, is used in such a way that the accuracy of its indications are immaterial to the accuracy of the results. Through avoiding the necessity for accuracy of indication in the detector instrument much effort in maintenance of detector instruments is avoided; and the condition of fitness of the instrument for its purpose in the practice of the invention is easily observed incident to the use of the apparatus by observing the degree of pointer deflection for small applied currents.

In the comparison of, for example, current transformer X (the transformer under test) with current transformer standard S (the laboratory standard current transformer) it is true of prior methods generally that the observations include the ratio error and the phase angle error of both the standard and the tested transformer, and that such observations must subsequently be corrected by the use of various corrections and calculations. While, as pointed out above, this invention in its preferred embodiments avoids all calculations and applications of correction factors by the use of a zero-error at zero external burden standard, it is pointed out that the invention is applicable with a lesser degree of freedom from the need for calculations in proportion as less refined apparatus is employed. Thus, the method may be practiced using a multiple-range standard of a ratio correction factor which is not unity throughout all its ranges of operation. When this transformer is employed according to my methods it is clear that the observations are subject to a criticism applicable to prior comparison methods generally, which criticism is that the errors due to the standard must be added to or subtracted from the observations determined in the course of practicing the method, and the proper choice made between addition and subtraction in each case. However, as pointed out above, the multiple-range current transformer standard designed to operate at zero burden is smaller, lighter, and therefore less expensive and can be calibrated in itself.

Further, the invention may be employed using any standard transformer, calibrated with a zero burden and for which the corrections at zero burden are established and tabulated for the various values of load current at which testing is to be carried out. In such cases, it is clear, of course, that for each testing current there is a different value of ratio and phase angle applicable to the standard transformer thus used, so that the number of arithmetical corrections are multiplied. However it is evident that there is still advantage in this method because, irrespective of the burden on the tested transformer, the number of correction tabulated factors required is fixed at a minimum because the standard operates at zero burden.

This method, in general similarity with a well-known "Silsbee" method, which is outlined on page 617 of Laws on Electrical Measurements, 2nd ed., McGraw-Hill Publishing Company, evaluates components of the differential current which flows through the indicating instrument, one component of which is measured substantially in-phase with the currents which flow through the secondaries of S and X and which is a substantially exact indication of the ratio of X in terms of the ratio of S, and the other component substantially in phase-quadrature with the currents which flow through S and X secondaries and which is substantially an exact indication of the difference in phase angles of X and S. The here-disclosed method, however, involves certain notable departures from prior methods of resolution some of which will now be pointed out.

When a detector wattmeter is employed to sense the circuit conditions, the difference current above referred to is passed through the current coil of the wattmeter. A voltage is then applied to the potential coil of the wattmeter such that the current through the potential coil is in phase with the currents in the transformer secondaries, and the deflection of the detector wattmeter is proportional to the ratio error; and the same voltage is next applied to the potential coil of the wattmeter such that the current in this coil is in phase-quadrature with the current in the transformer secondaries, and the deflection of the detector wattmeter is proportional to the tangent of the phase angle difference between X and S. According to the Silsbee method referred to the next steps in the method of determining the ratio and phase angle are calculations which steps are avoided in the preferred modifications of my invention.

It is a necessary condition of the foregoing determinations that it be definitely established that the current which flows in the potential coil of the wattmeter is substantially, on the one hand in phase with the currents through the primaries of the current transformers, and on the other hand in phase-quadrature with the currents through the primaries. While the theory of this invention agrees with and proceeds on the basis of the practically accurate assumption that the components so determined are accurate, this method includes steps which absolutely establish the conditions that; on the one hand for determinations of the in-phase component the current in the potential coil is in-phase with the current which flows in the transformers' secondaries and that this is, for all intents as to practical accuracy, in phase with the current flowing in the primaries of the transformers; and that on the other hand for determinations of the quadrature component the current in the potential coil is practically in phase quadrature with the current which flows in the transformers' primaries being exactly in phase quadrature with the current which flows in the secondaries of the transformers. These conditions are attained by passing a current through the current coil of the detector wattmeter which is exactly in-phase with the current through the secondaries when the secondaries are connected in series, this in-phase current being obtained from the terminals of a practically non-inductive resistor of very low resistance placed in series in the circuit of the transformers. It will be appreciated (1) that the voltage across this resistor is in-phase with the current flowing through the transformers, (2) that the voltage across this resistor will be practically in phase with the difference of the transformer secondaries currents when this difference is subsequently permitted to flow through the wattmeter current coil, and (3), that the circuit of the wattmeter current coil must be practically non-reactive; for example, among other elements, the mutual inductance and self-inductance of the wattmeter must be practically zero or compensated to zero.

Being satisfied that the design of the detector instrument and circuits are such that they allow current to flow in the detector current coil which is practically exactly in phase with the current through the non-inductive resistor, such current is permitted to flow in the current coil circuit and the potential of one phase of a quarter-phase source of uniform known voltage having a phase shifting device (which obtains its voltage from the same polyphase source as the source of the current through the current transformer primaries) is applied to the potential coil of the wattmeter. The phase shifting device is then caused to alter phase until the detector wattmeter indicates zero watts; in other words the condition desired that the current through the potential coil be in phase-quadrature with the current through the current coil is established. This means that the potential applied to the potential coil is with a sufficient degree of accuracy in phase-quadrature relation to the current in the primary circuits of the transformers.

In the foregoing paragraphs it has been stated that the phase shifting device is operated until the voltage in the voltage coil of the wattmeter is in quadrature with the current in the current coil of the wattmeter and that this is a sufficiently accurate approximation to the required condition that the voltage applied to the voltage coil should be in quadrature with the primary current of the transformers. That this is a permissible approximation will be evident from the following considerations: The proposition is that, for the purpose of phasing-in, the primary and secondary currents can be treated as in-phase; that is, the phase angle errors of the transformers can be neglected and therefore reference to the secondary current is acceptable as a reference to the primary current. This is true because the effects of the phase angle error upon the determinations of ratio error and phase angle error, are negligible; that is, the difference between a mathematically exact determination in either case, and the measurement based on the approximations, is negligible. The mathematically exact determinations differ from determinations based upon the approximation, only by the percentage measured by the tangent or the sine of the phase angle error. Since the phase angle errors of such transformers are of the order of less than two degrees, and the tangents thereof not more than .035, it is clear that the error in the error due to the approximation is not more than 3½%. Ordinarily the phase angle error is less than a half degree and the error in the error due to the approximation then becomes less than a percent.

To this point the improvements referred to as contributed by this invention include the method described of establishing that the current through the potential coil is practically either in phase or quadrature relation to the current that passes through the transformer secondaries.

The next step, when proceeding in general accordance with the Silsbee method, proceeds with the wattmeter current coil connected across the secondary terminals of the transformers, and with a current measuring instrument or ammeter in series with the transformer secondaries; and readings of the wattmeter deflections are taken with the two phases of quarter-phase voltage applied to the potential coil of the wattmeter, and the currents in the secondaries are recorded. Since the corresponding voltages, currents, and wattmeter readings determine the phase and ratio, deviations are calculated readily. However, the inclusion of the ammeter in the secondary circuit imposes its burden on the standard transformer. This imposition is avoided by the method of this invention as will be described.

In what is to follow it will be shown, among other things, that the detector wattmeter employed in the present invention requires no calibration and, while desirably a very sensitive instrument and free from reactive impedance, it need not be an indicating instrument; that the skill required of the operator of prior methods in general in making calculations from the data obtained in his practice of such methods may be avoided; that the determinations of the ratio and the phase angle, of the transformer under test and standard transformer may be directly indicated by indicators on apparatus employed in the practice of this new method; that through employment of the method it is possible to use apparatus such that the application of correction factors is eliminated and the readings of the indicators on the apparatus are the errors of the transformer under test usable without any calculation whatsoever; and that this method is nevertheless equally capable of using prior types of standard transformers which operate with ratio and phase angle errors, although correction factors corresponding to such errors must be applied to the indications obtained in the practice of this new method therewith.

In order to operate a standard transformer in the practice of the new method in such a manner that it carries an effective external burden equal to zero at the time adjustments establishing a measurement condition are completed, the principle is employed that the burden of urging the difference current through the external path may be entirely carried by a source of current auxiliary to the transformers.

This auxiliary source is regulatable so that the amount of current supplied by it is adjustable and so that the condition of non-deflection in the detector is established thereby, which condition connotes not only that there is zero external burden on both the standard transformer and the transformer under test, but also connotes that the value of the current supplied from the auxiliary source is equal to the difference current of the standard and the tested transformer and is in phase with the difference current. Since the value of the difference current is indicative of the ratio of the tested transformer in terms of the ratio of the standard transformer, and the phase angle of the difference current is indicative of the phase angle of the two transformers, and moreover, since the preferred method uses a standard transformer having zero errors as used, the value of the current supplied by the auxiliary source and its phase angle being respectively equal to those of the difference current at the significant condition of the detector, such values are true indications of the ratio and phase angle of the tested transformer. As will now be pointed out, this invention recognizes this auxiliary source as one which can, when properly designed, in and of itself provide the means of measuring the ratio error and the phase angle error of the tested transformer directly and without resort to any calculations, or application of correction factors when the zero error standard current transformer is used.

It has been pointed out that the detector wattmeter when used in accordance with the method of which this new method is an improvement has connectable to the voltage coil thereof the phases of a two-phase source of voltage and in the practice of the older method the phasing in is done by adjusting the detector to zero deflection with the two current transformers connected in series with the current coil of the detector and the voltage coil of the detector connected to the secondary of a phase shifter which obtains its primary voltage from the same source as the primary current of the current transformers, so that the phase relations are fixed and that the phase shifter can be used to adjust for the phase shift introduced in the current regulating circuit including the primaries of the test and standard transformer. This, in the older method, established the quadrature voltage as being in phase with the component of the difference current which is indicative of the phase angle of the tested transformer, and the voltage of the other phase as being in phase with the ratio error component of the difference current, so that calculations of both errors are made from the readings of the detector wattmeter. By the present method, phasing-in is accomplished in a similar way by using a phase shifter to adjust a quadrature source of voltage applied to the potential coil of the detector until its reading is zero, thus indicating the voltage to be in quadrature with the current in the secondaries of the transformers, the current coil obtaining its current from a small non-inductive resistance in series with the transformers. The auxiliary source of current used to oppose the difference current and which provides the means of measuring the ratio and phase angle errors directly as above referred to, is directly associated with the output of the phase shifter so that the current of this auxiliary source bears a known fixed or determinable phase relation to the voltage applied to the potential coil in the position of the phase shifter corresponding to the phased-in relation referred to. With these features in the apparatus the method of operation includes adjusting the auxiliary current until there is no deflection in the detector, under which condition there is no burden on the transformer under test or on the standard transformer and the value of the compensating current is a measure of the difference current of the transformers. However, in order to get the ratio and phase angle errors of the transformer under test directly, I measure out the two components of the difference current separately. This is most simply done by measuring out one component in phase with the secondary current of the two transformers and the other component in quadrature with the secondary current. Accordingly the auxiliary source is preferred to be a two phase source, in which the phases are in quadrature. One phase is in phase with the in-phase output of the phase shifter, and the other phase is in quadrature with the in-phase output of the phase shifter. Accordingly, a current from the in-phase portion of the auxiliary source when flowing in an amount sufficient to equal the in-phase component of the difference current, is, when measured, a true indication of the ratio error; and, similarly, a current from the quadrature-phase portion of the auxiliary source flowing in an amount sufficient to balance the quadrature component of the difference current, is, when measured, a true indication of the phase angle error. Detectors in general require for their successful use the concurrent flow of the auxiliary currents in order to establish a condition of zero current flow through the detector coil at the correct relative values of component currents, but when a very low impedance, non-reactive, detector is employed, each component may be independently measured out correctly before the other has been compensated to zero. With such a special detector the effect of a two-phase auxiliary source is obtained by making the in-phase determination with the auxiliary source excited from the in-phase output of the phase-shifter and thereafter making the phase-angle measurement with the auxiliary source excited from the quadrature output of the phase-shifter.

The current components from the respective sources can be regulated by using non-inductive variable resistors in series with multirange milliammeters, but multirange milliammeters, are, like a calibrated detector, measuring instruments which are both delicate and expensive, and moreover are subject to development of errors. This invention has as one of its objects the avoidance of the use of such instruments and in successfully doing so recognizes the existence of certain fundamental facts. Thus, it is recognized that the errors which are being measured are of a low order of comparative magnitude, that is, the errors in ratio, for example, to be measured are usually less than one percent, and in more modern transformers merely a small fraction of a percent. Accordingly, the error in current measurement without correction would be no more than one percent in most cases. In making a determination of the error in the transformer, therefore, one percent of error in its determination is of minor consequence because it is only one percent of one percent, or an ultimate error of one in ten thousand. It is further recognized that a source of three-phase voltage of comparative constancy is available in any place at which the invention may be employed. Such source may be a regulated commercial source from which it is common to expect regulation within one or two percent of a normal in any measuring period. This one or two percent variation is the possible source of negligible error in the error above referred to, which can, of course be eliminated by more exact regulation.

A large number of values of current are made available from such an auxiliary source of current the potential of which is derived from such a regulated source of voltage, which, in a convenient way, is the same source as the testing current source for the transformers. These values of current are available in small values differing by known, and preferably equal, increments; sufficient in the aggregate to balance any probable differential current component to be obtained in a test. This auxiliary source is made of ample capacity to insure its ability to carry substantially all of the load represented by the difference current, so that, in truth, the transformers (test and standard) are not burdened.

It will appear that any desired degree of accuracy of measurement of ratio error component current and phase angle component current is provided for by employing the principles of this invention. This is done in a simple manner in such a way that the same set of indicators and the same value of voltage applied to the auxiliary source are employed to secure all of the points on a calibration curve necessary to a complete test. Thus, while a constant maximum value of voltage is available in the auxiliary source of the specific embodiment of apparatus to be described and this maximum value is made available in 100 values differing by equal increments so that, in unmodified form, this source can supply 100 different values of current, this number of different values is, by means also disclosed, extended to provide in the illustrated embodiment, for six times as many values of current, or six hundred known values. Each group of 100 values is associated with the measurement of errors at each one of six values of load current on the transformers, and the number of groups, of course, is determined by the number of loadings of the current transformer desired to be obtained.

In the use of the apparatus which depends upon the constancy of a voltage source to determine a certain value of current, the degree of constancy can, of course, be ascertained by reference to any connected indicating switchboard voltmeter and, if it is constant but of not the required value, the variation is simply provided for by applying a corresponding correction factor to the measured value of ratio and phase angle.

In the development of the invention in the measurement of instrument transformer errors certain component methods and apparatus generally referred to above, and more specifically pointed out below, have also been developed which have importance in and of themselves.

One component method of importance relates to the evaluation through direct physical measurement, of the value of an alternating current electrical quantity such as a current.

The errors of a transformer are customarily determined for various values of load current. The usual rated secondary current is 5 amperes, and the error determinations are made at 5, 4, 3, 2, 1, and .5 amperes. The value of this load is read by an ammeter in series with the standard transformer. This ammeter itself forms a burden for the transformer. According to this method, the ammeter is not involved as a load at the time error measurements are made, hence its burden does not affect the results; means being provided to insure that, when the load current has been adjusted to the required value the ammeter is shunted from the circuit.

Another development in the invention consists in the arrangements whereby certain required values of current are obtained from a source of voltage. The testing of current transformers is perferably made at 5, 4, 3, 2, 1, and .5 amperes on the secondary. At 5 amperes, a ratio error of one percent is an error current of .05 ampere. Correspondingly, the error currents at the 4, 3, 2, 1, and .5 ampere values are .04, .03, .02, .01, and .005 amperes. These values of error currents are, by my method, required to be duplicated by a separate source at the selection of the operator. Through employing a source of fixed voltage a duplicative error current of .05 ampere can be obtained by using a corresponding value of resistance in series with that value of voltage. For example, if 110 volts is employed as the value of voltage the corresponding values of resistances and currents are:

| Amperes | Ohms |
| --- | --- |
| .05 | 2,200 |
| .04 | 2,750 |
| .03 | 3,667 |
| .02 | 5,500 |
| .01 | 11,000 |
| .005 | 22,000 |

These six values of resistance, being quite high, would require considerable resistor space in the measuring apparatus; and, since the resistors are required to be non-inductive and non-inductively related, and since it is preferable from an economic point of view to reduce the amount of space the resistors require, I have fortunately discovered that by choosing a certain value of voltage a minimum of resistor space is required and a very much lower cost of apparatus results. One benefit of this choice was that the possibility of combining resistors having smaller values of resistances either in series or parallel to obtain the required values of resistance was recognized and as a result the six resistors originally indicated as being necessary were reduced to four in number. Thus, at the chosen value of fifty volts, the resistances required are 10,000, 5,000, 2,500, 1,666⅔, 1,250, and 1,000 ohms, to produce the values of current above listed. These values of resistance I have discovered can be obtained from four resistors occurring in the following combinations (1) 10,000, 5,000, 2,500, 1,250; (2) 5,000, 5,000, 1,250, and 1,250; (3) 5,000, 2,500, 1,250, and 1,250. The arrangements of these resistors are described below.

Moreover it will be observed that an aggregate value of 19,166⅔ ohms indicated to be necessary to obtain six values of current, actually is reduced in one case to an aggregate value of 10,000 ohms and the four resistors are actually standardizable values, and are related as simple multiples of the basic value 1,250 ohms.

Another outstanding development of this invention is the provision whereby, without the employment of instruments, and especially without the employment of precision instruments, any of a large number of desired values of alternating current may be assuredly obtained and maintained with an assuredly high degree of precision. Certain voltages delivered by utilities to their laboratories are maintained constant, the departures from constant value being maintained at a low value. This value can easily be kept within one percent, for example.

In the method of this invention it is desirable to obtain values of current varying from zero to .05 ampere and the values obtained should be accurate to within 2%. With the apparatus here employed, the accuracy is almost wholly dependent on the accuracy of the regulation of the voltage source, and if this regulation can be maintained within 1% at all times, the values of current obtained will be accurate to within 1%. Thus, when the apparatus is set to call for .05 ampere, it is certain that it will be no greater than .0505 ampere and no less than .0495 ampere. If greater precision of voltage control is maintained, the accuracy of fixation of the current resulting is thereby improved. The limits of accuracy of current obtained are, however, further extended in another way.

It has been pointed out that certain values of testing current to wit, 5, 4, 3, 2, 1, and .5 amperes on the secondary are employed to constitute the test load current for the secondary of the tested transformer, and that it is necessary to produce for a 1% ratio error in respect to each of these test currents, a corresponding value of current constituting a duplicate of the error current; that is, 1% at 5 amperes equals .05 ampere
1% at 4 amperes equals .04 ampere
1% at 3 amperes equals .03 ampere
1% at 2 amperes equals .02 ampere
1% at 1 ampere equals .01 ampere
1% at .5 ampere equals .005 ampere and it has been indicated how these values of current, duplicative of error currents, are produced from a constant source of voltage.

The ratio errors of current transformers of a good class may be included by the 1% value at all of the loading currents to which they may be subjected. There are, however, included within this 1% value an infinite number of possible values of ratio error. Nevertheless, every true value of ratio error is close to one of the 100 parts of 1% ratio error, and in general closer to one than to another. Thus, the ratio error may be nearer to .89% than to .90%. Inasmuch as the determination of the ratio error is close enough when determined to the nearest one-hundredth of one percent, these values are used here for illustration. So, if the ratio error is in fact .89% at 5 amperes on the secondary of the current transformer under test, the value of the ratio-error current is .89% of 5 amperes or .0445 ampere. Again, if the ratio error were in fact .88% at 5 amperes on the secondary of the current transformer, the ratio error current would be .88% of 5 amperes or .0440 ampere. Thus it may be shown that for each one-hundredth of one percent of ratio error that might be characteristic of a current transformer, there is a different value of error current and that this value of error current is directly proportional to the percentage. Hence there are 100 values of error current possible within a 1% maximum probable ratio error. Therefore, inasmuch as the present invention requires the application of a current which is duplicative of the actual error current for any of these one hundred possible values when the secondary load is 5 amperes, suitable provisions are made to produce such currents. In general, such means consist in providing for applying one hundred different values of voltage, including the value of 50 volts previously mentioned. The 50 volt source is divided so that values of voltage ranging from .5 volt to 50 volts in .5 volt steps are available. Each value of voltage, when applied to a resistor designed to give .05 ampere at 1%, produces its proportionate part of that .05%. The division is accomplished by taps on a transformer. Accordingly, the taps may be numbered in accordance with the fractional part of 1% which they produce. However, if only one transformer secondary load current is considered, the markings can be in terms of current. It is thus readily appreciated that the voltage source is employed to provide a hundred different values of current through the particular resistor to which the voltage is applied, in the instanced case, the resistor which permits the flow of .05 ampere when 50 volts are applied.

When the test current is reduced to 4 amperes, the top possible value of ratio error current is, as pointed out above, .04 ampere. Again there are an infinite number of possible values of ratio errors within the one percent range, but any possible error within this range is nearest to a one-hundredth of one percent value. Since the same value of voltage, 50 volts, is applied to the resistor yielding .04 ampere of duplicative current, any one-hundredth percent of .04 ampere may be obtained from the same taps as employed at 5 amperes. Thus, the tapped source of voltage is employed to provide indications of the value of a ratio error compensating current which is equal to the error current of the tested transformer, as well as to provide the energy required to produce these error currents. Since in this case six values of resistance and six different maximum values of error currents are provided, and each is divided into 100 equal parts, it is evident that six hundred exactly known values of current capable of duplicating error currents are provided. By the simple addition of one more group of taps, as pointed out below, the number of values, as well as the precision with which the errors and error currents can be determined, are extended to 6,000 in number and to $\frac{1}{100000}$ ampere instead of $\frac{1}{10000}$ ampere.

In providing a source of voltage having a hundred values differing by equal increments of .5 volt, it would, of course, be obvious to provide a source such as a potentiometer having a hundred taps, or a transformer winding having a hundred taps on the secondary such that the tapped voltages would be stepped by increments of .05 volt. If then, it were desired to extend the precision of the error determinations so that they could be made to the nearest .001 percent, a thousand taps would be necessary.

Instead of using a hundred taps to get .01% accuracy the invention provides for using but 20 taps to get .01% accuracy in 100 stepped values of voltage, and by the addition of ten more taps, .001% accuracy is obtained with 1000 steps of voltage. The principle consists in adding small increments of voltage to large increments of voltage selectively. For example, the source of voltage is made up with groups of voltage taps, the differences in one group being different than the differences in another group, and one group being a subgroup of the other group, that is, the subgroup constitutes, as a whole a component of the major group. Thus, there are 10 components of the major group and one of the components is divided into 10 sub-components. Specifically, for fifty volts, there are ten major group taps of five volts each giving voltage values of 5, 10, 15, . . . 50 volts, and there are 10 taps of .5 volt between adjacent taps, giving .5, 1.0, 1.5 . . . 5 volts. Therefore, by adding the voltage of any tap of the minor group to any tap of the major group, any value of voltage from .5 to 50 volts, in steps of .5 volt, can be obtained. If one component of a minor group yielding .5 volt be itself divided into 10 parts, it is clear that increments of .05 volt are obtained, hence 1000 steps equally dividing 50 volts.

In describing the main features of method and apparatus for measuring the ratio errors of an instrument transformer, almost all of the elements required for the measurement of phase angle error are described. This becomes clearer when it is appreciated that the phase angle error is dictated by that component of the exciting current which is in quadrature with the primary current of the transformer. Referring to Figure 6b it is seen that this component current is related to the phase angle as follows:

$$\tan B \text{ equals } \sin B \text{ equals } \frac{I_{BX}}{I_S}$$

It is also true that these phase angles (B) are generally not more than 2 degrees, and for such small angles, the angles themselves are substantially arithmetically proportional to their tangents (or their sines). It can be shown that when $I_s$ equals 5 amperes, one hundred minutes of phase angle error corresponds to a quadrature component $I_x$ equal to .1457 ampere.

In like manner to the measurement of ratio error currents, the values of $I_{BX}$ are measured. A hundred values of measuring amperage are provided for each of 5, 4, 3, 2, 1, and .5 ampere secondary currents, and the resistances employed are respectively 345.7; 429.5; 573; 859; 1,718.5; and 3,457 ohms. The same value of 50 volts is applied to these resistors. The voltage is, however, applied in quadrature with the voltage used for measuring the ratio error, and a separate transformer with taps is provided patterned after those provided for the ratio error measuring arrangements previously described. These taps are conveniently marked in minutes from 1 through 100 and the phase angle errors are conveniently read directly in minutes when it is determined that sufficient duplicated phase angle error current is provided to exactly equal that of the tested transformer.

Both ratio errors and phase angle errors occur in transformers in positive and negative senses, and, as respects phase angles, are spoken of as lagging and leading. By the methods of this invention the sense of the errors is determined through the operation of the method, and no skillful judgment is required to determine the sense because it is directly indicated by the position of certain indicators, which are simply the handles of switches which must be placed in the correct position to obtain the necessary adjustments in securing the values of ratio error and phase angle. Thus, when the ratio error current is positive, as when the instrument transformer is delivering 5.05 amperes instead of 5.00 amperes as it would were the error zero, the adjustment of the standard transformer to match this error current must be positive and the direction of the current therethrough is such as to add up to 5.05 amperes.

With the objects referred to in the foregoing in view a more complete understanding of the invention will be obtained from the following specification describing the method in detail in conjunction with preferred apparatus for carrying the method into effect, and wherein reference is made to the accompanying drawings for illustration of various principles involved and particular embodiments of apparatus embodying the principles of the invention, and in which:

Fig. 1 is a diagrammatic representation of apparatus, including a special instrument and associated elements, employed in practicing the invention;

Figure 2A:
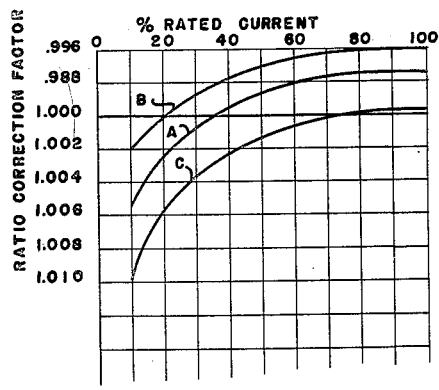
Figs. 2A and 2B show characteristic curves for a common type of instrument transformer.
Figure 2B:
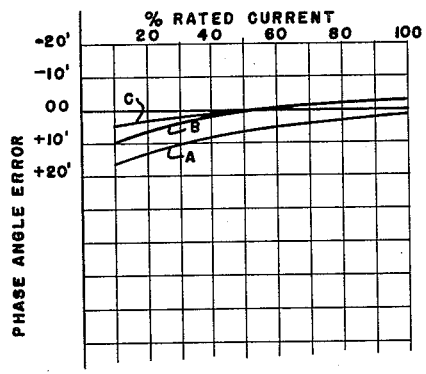

Figs. 4, 4a, 4b, and 4c illustrates various modifications of a detail;

Figs. 5a and 5b illustrate a step of the method;

Figs. 6a, 6b, 6c, and 6d illustrate additional steps;

Fig. 7 is a simplified diagram of the apparatus of Fig. 1;

Fig. 8 illustrates certain connections for the steps of the method.

Referring to Figure 1, the apparatus employed comprises a source of three-phase power 10, a transformer 12, a rheostat 14, an ammeter 16, and an instrument 18.

The instrument 18 proper, in general, comprises the following units: the standardizing transformer 20, providing exposed terminals 22; a double-pole, double-throw switch 24; single-pole, double-throw switch 26, de-burdening switch 28; phasing-in resistor 30; ballast resistor 32; ammeter terminals 34; exposed terminals 36 for connection to transformer under test; detector wattmeter 38; double-pole, double-throw switch 40; phase shifter 42; calibrated transformer-error adjusting and indicating unit 44; and phase converter unit 46.

By the term "adjusting unit 44" so identified in Fig. 7, is contemplated such apparatus illustrated as is included for the specific purpose of adjusting the compensating in-phase and quadrature currents so that zero current flows in the current coil 48 of detector wattmeter 38. In Fig. 7 the "phase converter unit" 46 is illustrated as segregated from the adjusting unit merely to emphasize the existence of the function of translating three phase current to two phase current, yet maintaining the phase relations constant between the primary current of transformers X and S and the compensating currents to be supplied by the adjusting means 44 operating on the energy supplied from the two phase source, such constancy being determined by the setting of phase shifter 42. It is impracticable to point out the adjusting unit 44 as a single subcombination of elements by a single reference character because the elements are scattered and some of their functions overlap with other units. As constructed and contemplated objectively, the adjusting unit includes: both the primary and secondary windings of transformers 52 and 54; and the means whereby two quadrature related voltages are applied to these windings, each such voltage having fixable phase relation to the current supplied to the primaries of transformers X and S, which means, as shown, includes the shown connections whereby the input terminals of transformer 52 (1, 3) are connected to the output terminals 1—3 of the three-phase shifter. The adjusting means further includes the connection of the input terminal 4 of the primary of transformer 53 to the center tap of the primary winding of transformer 52 and the connection of the other input terminal of the primary winding of transformer 53 to the second output terminal (numbered 2) of the phase shifter. This is the well known Scott connection, which causes a ninety electrical degree phase relation between the voltages applied across the input terminals of transformers 52 and 53.

The adjusting unit further comprises the groups of terminals 60, 62, 64, and 66 with their percentage and minutes markings, the tap connections by which these terminals are connected to the various turns of the transformer secondary windings, adjustable contact arms 60a, 62a, 64a, and 66a and conductive connections to other components of the unit. The adjusting unit further includes the plus and minus ratio error indicator and selector switch 68; the "lead and lag" phase angle indicator and selector switch 69; the group 94 of error current determining resistors 70 and 80 with their connections and selector contactor 72; and the double pole double throw selector switch 40 with which to select one or the other of the two quadrature voltage sources to be applied to the voltage coil 50 of detector wattmeter 38. In a sense this detector 38 forms a part of the adjusting means inasmuch as it is through its indications that the operator knows when the condition of zero difference current exists.

Figure 3:
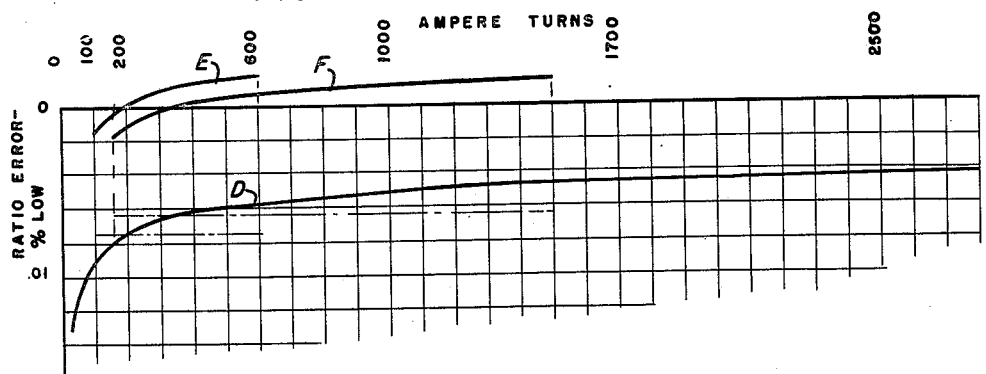
Fig. 3 illustrates the principle of a standard tranformer construction.

The standardizing transformer 20 is preferably of the type disclosed in my Patent No. 1,550,906 for Instrument Transformer, issued August 25, 1925, but designed with special reference to obtaining zero ratio and phase angle errors at zero burden for each of the values of ampere turns at which it is to operate. In Figure 3, curve D represents the ratio error curve for all ranges of a multiple-range, zero burden transformer constructed according to the teachings of the prior patent referred to. Curve E represents the ratio error of that portion of the winding of the same transformer which has been altered in construction so that all departures of the ratio error from zero may be treated as negligible, even for precision measurement purposes. It will be observed that the maximum departure from zero error as indicated by curve E for that winding of the transformer is at all values of current, less than .003 per cent, and therefore negligible. Curve F is a corresponding curve for another portion of the transformer winding which has been altered to produce a mean ratio error of zero, and in which the departure from zero does not exceed .025%. In a similar manner, all of the component windings of a multiple-range, zero burden standard transformer are compensated. Therefore, the resulting ratio error for all ranges becomes less than .003% and therefore may be regarded as zero throughout all ranges.

The phase angle error is reduced to a negligible value throughout the various ranges by means known to the art.

The deburdening switch 28 is a normally closed switch which must be manually depressed in order to cause current to flow through the ammeter 16, and is spring pressed to closed position. This type of switch is conventional. Its purpose is to remove the burden of the ammeter 16 and phasing-in resistance 30 from the wattmeter when making measurements.

The phasing-in resistor 30 is of very low ohmic value (of the order of .01 ohm) and is non-reactive, being substantially non-inductive and non-capacitive. The resistance of resistor 30 is, however, made as small as possible, consistent with the sensitivity available in the detector wattmeter; based on the proposition that the greater the resistance 30, the more current flows to the current coil of the detector wattmeter, and the smaller the resistance 30 the less is the error in assuming there is zero burden on the two transformers during phasing-in operations to be described.

The ballast resistor 32 is of such value that the circuit including it and the current coil of the wattmeter, which forms a bridge link between X and S in series, is substantially non-reactive, so that whatever current flows therethrough is in substantially exact phase with the voltage across the terminals of the transformers.

The ammeter 16 is an ammeter having good accuracy, being used for indicating, in conjunction with the secondary of the transformers, the various values of primary current incident the adjustment by means of rheostat 14.

The detector wattmeter 38 comprises the current coil 48 and potential coil 50. The instrument should be as sensitive as possible, but its deflections are not employed in the preferred embodiment of my new method. In the preferred method, calibrations are omitted and the sensitivity only is material since the objective in the measurements is to have the pointer of the instrument indicate zero when the product of the alternating fields to the two coils are either in quadrature phase relation or one of them is zero.

The phase shifter 42 is a three-phase phase shifter and should be chosen for constancy of voltage ratio and fidelity of wave-shape translation. The phase converter 46 provides for an output voltage 1—3 in-phase with one phase of the phase shifter output and another output voltage 2—4 in phase quadrature with the voltage 1—3 by means of the well-known Scott or T transformer connection.

If the source of voltage is two-phase instead of three-phase, the phase converter may be omitted.

In the calibrated error adjusting unit an "in-phase" voltage 1—3 appears on the secondary windings 54, 54a of the ratio error current producing transformer 52, and a "quadrature" voltage appears on the secondary windings 58, 58a of transformer 56. These voltages have been chosen as fifty volts for reasons pointed out elsewhere. Ten divisions are made of the secondaries to provide 10 equal divisions of 5 volts each, 9 divisions of which are connected as shown to the groups of taps 60 and 62, and the tenth division of which is divided into nine equal subdivisions of .05 volt each and connected to taps of subgroups of taps 64 and 66. Dial-switch arms 60a, etc., are provided with each group of taps. It will be observed that the zero tap of group 60 is connectible to one terminal of the current coil 48 of the detector wattmeter through reversing switch 68, any one of resistors 70, and contactor 72, and that the common of arm 64a extends through switch 68 to the other terminal of the current coil. The arm 60a is connected to the zero tap of group 64 by conductor 78. Switch 68 simply reverses the transformer's connections to the coil 48. The connections of groups 62 and 66 are identical, except that resistors 80 are included in circuit instead of resistors 70. The taps 82 of all groups are extended to the top of the instrument and provided with markings indicating the percentage ratio error, and taps 84 similarly are marked to indicate minutes of phase angle error. As shown, the contact arms form pointers for indicating the values of the errors, and as illustrated, would indicate .66% ratio error and 44' phase angle. When 50 volts are applied between points 1 and 3 of transformer 54 connected as shown, an error value significant current flows from .00% ratio tap of group 60 via dotted line position of blade 68a through current coil 48, conductor 76, 5 ampere resistor 70, ring 74, conductor 88, blade 68b, group arm 64a to the .06% tap of subgroup 64. Group 60 supplies 30 volts and group 64 supplies 3 volts, and resistor 70 is such that under these conditions .033 ampere flows in the circuit, which equals .66% ratio error producing current. A similar circuit may be traced for groups 62 and 66.

Either phase of the quadrature related voltages 1—3, 2—4 may be connected to potential coil 50 of detector wattmeter 38 by switch 40. The "in-phase" voltage is obtained from terminals 1—3 via conductors 90 and the quadrature voltage is supplied from terminals 3—4 via conductors 92, by means of double-pole, double-throw switch 40.

Figure 4:
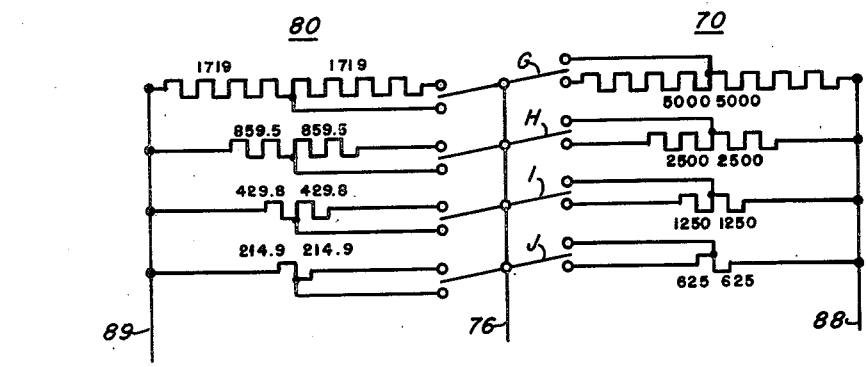

The current determining resistors 70 and 80, the values of which are calculated as pointed out previously, may be grouped as shown in Figure 1 so that when testing at 100% load the contactor 72 connects the correct resistors simultaneously and cannot connect more than one resistor, and when testing at other loads similar conditions exist. This arrangement employs a maximum number of resistors, however, and it is preferred to use arrangements such as shown in Figure 4. In Figure 4 the conductors 76, 88, and 89 correspond to those in Figure 1, but the resistor arrangement replaces that of Figure 1. When any one of switches G, H, I, or J is horizontal, the resistances of resistors 70 included in circuit are, respectively 10,000, 5,000, 2,500, and 1,250. Corresponding values of resistances of resistors 80 are included in the phase angle circuit. When H and I are both horizontal, the included resistance is 1,666⅔, and when H and J are both horizontal the included resistance is 1,000 ohms. A similar effect is found for resistors 80. Accordingly, the six required values of resistance for each error, is supplied by using four resistors required and paralleling certain of these to get the other two values required.

Figure 4C:
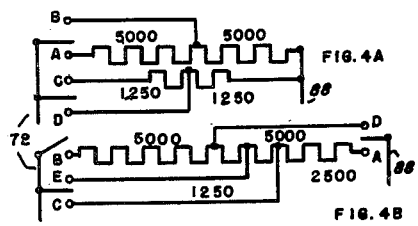

Two other arrangements of resistors for providing ratio measurements are illustrated in Figures 4A, 4B, and 4C, the table showing the manner of use.

The ranges of errors provided by these values of resistance are, as pointed out, plus 1% ratio to minus 1% ratio, and 100' lead to 100' lag. By the expedient of providing center taps on resistors 80 and 70 as shown and arranging their contacts as shown in Figure 4, the resistances at each load value may be halved by moving the corresponding switch into the angular position shown, in which case the current flowing for any particular position of the switches, and therefore indicative of double the value of the marking on taps 82 and 84. In this way the range of the instrument is easily and effectively multiplied. The same effect can be obtained, however, by doubling the voltage, as by including only half as many turns on the primaries of the transformers, as will be apparent to those skilled in the art.

With the foregoing apparatus, the method of measuring errors includes the following steps:

*Step 1.*—The purpose of this step is to so connect the secondary terminals of transformers S and X that only the difference between their currents will, when connections are altered for step 3, flow through coil 48 of detector wattmeter 38. This condition is illustrated by Fig. 7 wherein, regarding transformers X and S as having like nominal ratios of transformation, it is apparent that the secondary current of transformer X is $I_x$ and that of transformer S is $I_s$. Further, assuming that $I_{ds'}$ (later explained) is zero it will be clear that $I_{cc}$, which must flow through coil 48, represents the difference between $I_x$ and $I_s$, but only if the voltages in the secondaries of X and S are in the same direction in the circuit including them, or, in other words, in series additive relation. Assuming that $I_x$ is 5.01 amperes and $I_s$ is 5.00 amperes, the current $I_{cc}$ through coil 48 could be equal to their sum if the relation is subtractive. This would result from a wrong connection of transformer X to terminals 36 and the wrongness is by this step indicated by a substantial deflection in ammeter A, which ammeter is, for the purposes of step 1, substituted for the coil 48. Connecting transformer X to terminals 36, inserting all of resistance of rheostat R, close switch 24 to "check" position, open switch 26, close switch S and switch 26a, press 28 open and gradually increase current by reducing resistance R. The effect and purpose of initially inserting all of resistance R is to make certain (1) that the secondaries of current transformers S and X be not required to conduct an excessive current, (2) that an excessive current will not pass through ammeter 16; and (3) that the excitation of the transformers' cores is avoided while changing connections in the secondary circuits. The word "check" refers to the making certain, by this step, that the transformers are properly connected as to polarity. By leaving switch 26 open, detector coil 48 is relieved of energization; and in the "check" position of the switch 26 the coil 48, as illustrated in Fig. 6a, is replaced by ammeter 16, which is protected by shunt switch 28. By opening switch 28 before gradually increasing the current, the operator is made aware immediately of any excessive flow of current in the differential current path through the ammeter 16. Such excessive flow would be due to the incorrect polarity connection above referred to, or to a short circuit in the winding of the transformer X. If current indicated by ammeter 16 becomes perceptible, open S, reverse connections at 35 and preferably repeat the performance of step one. If ratios of X and S are equal and no short circuit exists in X, only a minute current flows through ammeter A though R is greatly reduced. This establishes the correct polarities of the two transformers for the following tests. If the current again increases excessively, however, transformer X is probably defective by reason of a short circuited winding, and should be rejected for repair. Step 2.—It is the purpose of this step to establish the phase relationship between the secondary current $I_s$ and two quadrature related voltages $E_o$ and $E_q$ such that $E_q$ is ninety electrical degrees out of phase with the secondary current $I_s$, and that $E_o$ is in phase with $I_s$. $E_q$ is the voltage appearing across the potential coil of the detector wattmeter during this step. For certain purposes, as pointed out elsewhere herein, the primary and secondary currents $I_p$ and $I_s$ may be regarded as practically in phase for this step, even though it is one of the objects of the invention to determine to what extent they are out of phase. This relationship is vectorially illustrated in Fig. 5b. This is a phasing-in step. Referring to Fig. 1, the resistance of rheostat 14 is fully inserted, switch 24 is moved to test position and 26 to the "φ in" position and switch 40 to the quadrature or "measure phase angle" position to take voltage from conductors 92. The circuit relationships shown by Fig. 5a are now established, so that there is no path for differential currents to flow through, and the two transformers function as one, in the sense that there is but one secondary current. The current through R is now increased. If a deflection occurs in the watt detector, which it generally will, the phase shifter is operated until this deflection becomes zero. The deflection becomes zero when the current in coil 48 is ninety electrical degrees out of phase with the current through voltage coil 50. The quadrature voltage is now in quadrature with the series current of the two transformers. A simplification of the circuit for this step is found in Figures 5a and 5b. The current through coil 48 is in phase with the current through the very small non-reactive resistor 30, which is the secondary current of the two transformers in series. In Fig. 5b, the position of $E_q$ is illustrated vectorially in its proper phased-in relation when $I_s$ is flowing and there is no deflection produced in the detector wattmeter. Since the phase angle between the primary current and the secondary current is very small in the transformers used and tested, it may be neglected for purposes of phasing-in, and $E_q$ may be regarded as 90 degrees from $I_p$. Step 3.—Measurement of ratio and phase angle error. Using five amperes as the load current on the secondary as an example, the contact 72 is placed in the 5 ampere position, and the current is adjusted by means of resistance R to the value of 5 amperes as indicated by ammeter 16. With switch 40 in the up or "Measure ratio error" position, and switch 26a open, switches 68, 60, and 64 are manipulated until zero deflection is produced in detector 38. This establishes a preliminary indication by the arms 60a and 64a on taps 82 of a first approximate value of the percent ratio error, and (see Figs. 6b and 6c) the component $I_{RX}$ (of the difference current $i_{dx}$) is matched by an equal component $i_{RS}$, furnished by the secondary windings of transformer 52; the direction of flow of which furnished component is such as to draw component $i_{RX}$ entirely away from the path through coil 48 and cause it to, instead, pass through the path provided through the secondary circuit of transformer 52. Thus, no ratio error component of the difference current remains flowing in coil 48, which permits the indicator of detector 38 to take the zero position because the current in potential coil 50 is in phase only with the ratio error component and in the absence of such component there is no torque produced in the instrument. Leaving the circuits otherwise as they are, that is, with components $i_{RX}$ and $I_{RS}$, flowing, switch 40 is moved to the down or "Measure phase angle" position to apply quadrature phase potential $E_q$, the source of which is the primary winding of transformer 58, on coil 50 over conductors 90 and through switch contacts 40a. A deflection of the pointer of detector 38 now occurs if there actually exists any quadrature component $i_{qx}$ of the difference current $I_{dx}$, because this component, if any, is precisely in phase with the voltage $E_q$ now applied to potential coil 50 so that a turning moment occurs on the detector pointer. The phase relation of $E_q$ and $i_{RX}$ is illustrated in Fig. 6c.

The next move is to move one of arms 62a or 66a from zero position clockwise over taps 84, watching the pointer of the detector to discover whether it increases its deflection. A decrease in deflection is required in order to cause the pointer to approach zero position. If the deflection increases, the "Lead-lag" indicating switch 69 is reversed, and this causes the deflection of the pointer to decrease as the arms 62a and 66a are moved clockwise in the direction of increasing minutes indications. The position of switch 69 therefore indicates whether the phase angle of the transformer X is lagging or leading with respect to the phase angle of transformer S. Having made this adjustment, the selector arms 62a and 66a are moved over contacts 84 until as nearly zero deflection as possible is produced in detector 38 again. In effecting this adjustment of the pointer, the secondary of transformer 58 has been caused to drive a current $i_{RS}$, through itself which is equal to the value of $i_{qx}$, and which is in such direction as to draw $i_{RX}$ entirely away from coil 48. The pointer may not reach zero position exactly because the increments of current afforded by taps 84 are finite and may cause the pointer to overshoot. The nearest to the exact value will be indicated when, moving arm 66a between two adjacent taps 84, the pointer is found to move through zero position. In order to be sure of the correctness of the indications switch 40 is again thrown to 40a position and the deflection of the detector 38 is brought to zero by switches 60 and 64. The reversals and readjustments of the deflections to zero are continued until no readjustments are necessary, with the line voltage applied at 10 being as nearly as possible that which will give the required voltage on the primaries of transformers 52 and 58. The process is thereby completed.

In the corresponding positions of the switches 60, 64, 62 and 66, the values of phase angle and ratio error are now indicated by markings of the taps contacted by arms 60a, 64a, 62a and 66a. The errors of standard S may now be regarded as having been adjusted to exactly equal those of X.

A similar procedure is followed for each of the values 4, 3, 2, 1, and .5 amperes on the secondaries if desired, the contactor 72 being moved to the corresponding position to provide the corresponding values of error currents. In order to determine values of errors of transformer X at other values of its secondary current, the steps 1 and 2 are repeated to assure the flow of the required secondary current, as four amperes, and to assure that voltages $E_q$ and $E_o$ are "phased in" with the new secondary current as before. The ratio and phase angle errors for the four ampere value are now determined by step three procedure precisely as before for the five ampere range. The corresponding errors for secondary currents 3, 2, 1 and .5 amperes are determined in like manner.

Figure 6a shows the schematic wiring diagram. Opportunity is afforded for the difference current of the two transformers to flow through detector coil 48 in its normal way. The current through detector coil 48 is made zero in this step. The relations between the quadrature voltage $E_q$ and the quadrature component of the exciting current is illustrated by Figure 6c, in which it is apparent that when no current flows in coil 48, because $I_{BX}$ equals $I_{RS'}$, that is, the phase angle producing components of the currents due to X (the transformer under test) and S (the standard transformer) are equal, no deflection can occur in the detector wattmeter. Figure 6d illustrates the same effect for the ratio components of the error currents for the transformers when these components are equal.

It will be evident that, since the power for altering the phase angle of the standard transformer comes from a source outside the standard transformer itself, there is still no burden on either transformer, and that, therefore their errors are exactly defined by the calibrated source of error currents.

Another schematic illustration of the crlcuit of Figure 1 is given in Figure 7. In this figure, the source of artificial error currents 44 together with the standard transformer S is regarded as the modified standard S'. The resultant current of S' is $I_{ds'}$ and is equal to $I_{dx}$ when the current through 48 is zero. The triangle in the center of 44 is intended to indicate a source of current $I_{ds'}$ having manually variable components $I_{bs'}$ and $I_{rs'}$ which are in quadrature and phase with $I_p$ after the phasing-in step.

A simple concept of the calibrating method is as follows: the standard transformer having zero ratio and phase angle errors is prevented from furnishing a difference current while comparing it with the transformer under test (which has definite errors). This is done by means of small currents which are sent into the secondary of the standard to adjust it until it has the same errors as the transformer under test. When this adjustment is completed no difference current flows between the two transformers and the compensating dials indicate the ratio and phase angle of the transformer under test. The standard transformer with the compensating equipment can therefore be called an "adjustable error standard." This becomes particularly apparent when the compensating currents are sent into the primary or a tertiary of the standard transformer.

When the method is practiced using a standard transformer which has appreciable ratio and phase angle errors, the method can be modified so that these errors are eliminated and the effect of a zero-error standard obtained. The elimination of any particular error in the standard is accomplished by the same method as used in imposing an error on the standard. Thus when 72 is placed on position 5, another circuit is completed through the transformer, and error compensating resistance, and another 50 volt transformer. This standard transformer error compensator is, of course, different for each value of testing current, but is not influenced by the positions of switches 60, 62, 64, and 66.

This new system is somewhat similar to some of the prior art methods; for example, it measures the values of the difference current and these measured values are indicated by the settings of dials at the completion of the steps of the method. However, the new method operates in such a way that the burden on the standard transformer is decreased as adjustment proceeds and is eliminated when adjustment is completed to give the required readings.

Not only is the burden removed entirely from the standard transformer but it is also and in like manner removed from the transformer under test. Hence the calibration of the tested transformer is, by this invention, free from errors due to the burdens of testing apparatus.

Another feature in common with prior methods is that values of error are found through the action of determinable values of current. In the past, however, such indications of current have been made by current meters, such as milliammeters which are in themselves expensive and delicate instruments. The present invention employs the action of current which constitutes an agency of adjustment but the value of this current is determined without the aid of current meters, being as will be seen, apportioned out in known amounts simply by the positioning of an indicator, the position of the indicator being related to other apparatus which produces an exact value of current output when the indicator is so positioned. The successful avoidance of the use of current measuring instruments of the moving pointer type is a substantial improvement because not only is the cost reduced but the resulting apparatus is permanent in character and not likely to get out of adjustment.

Another feature of this invention which is similar to prior methods resides in the employment of a "null" method. By the term "null" it is generally meant that the conditions of adjustment are such that zero current flows in the detector and zero deflection results to indicate the conditions of measurement have been achieved. This is true of the method of this invention, since a condition of zero deflection is achieved in completion of the adjustments for both ratio and phase angle.

Having described my invention and explained the principle of its operation, both in the method and a preferred embodiment of apparatus for carrying out that method in accordance with the statute, it will be apparent that other variations of the invention may be resorted to by those skilled in the art for the purpose of accomplishing one or more of the useful results flowing therefrom without departing from the spirit of the invention. It is therefore to be understood that the disclosed embodiments are illustrative only and the following claims are referred to for a definition of that for which the inventor is secured hereby.

I claim:

1. A method of measuring errors in transformers by using: a standard transformer, an instrument having a voltage coil and a current coil with an indicator deflected in accordance with the products of currents passing through the coils, a source of alternating current voltages having two voltages in phase quadrature, means calibrated in terms of transformer errors for delivering current from said sources of voltages to the secondary winding of said standard transformer, means for connecting the primary windings of the transformer under test and the standard transformer in series and the secondary windings in series and with the current coil of the instrument connected across the terminals of the transformer to permit the difference of currents in the secondaries to flow through said coil, means for disconnecting the current coil from said relation and means for causing a current to flow therethrough which is in phase with the currents through said secondaries when so disconnected, means for delivering alternating current of like character with the voltage of one of said voltage sources to the primary windings, means for delivering voltage to said voltage coil and to said calibrated means from either of said two voltage sources, said delivering means comprising means for adjusting the phase relation between the delivered voltage and the voltage source; a resistor having low value of non-reactive resistance for connection in series with the transformer secondaries; the method comprising, disconnecting the current coil from the connected condition across the terminals of the transformers and connecting the resistor so that current flows through the secondaries of the transformers in series with the resistor, connecting the current coil to receive current from across the terminals of the resistor, connecting the voltage coil to its voltage delivering means for delivery of one of said voltages, adjusting the phase of this voltage until no deflection occurs in the instrument; reestablishing the connection of the current coil across the terminals of the transformer secondaries, and (a) adjusting the calibrated means associated with the said one of said voltages until zero deflection occurs in the instrument, (b) exchanging the other voltage source for the said one voltage source, adjusting the calibrated means associated with the later voltage until zero deflection occurs in the instrument, and repeating (a) and (b) until no further adjustments are necessary to attain zero deflection of the instrument pointer.

2. Apparatus for testing transformers comprising, in combination: a standard transformer, a detector having a current coil and a potential coil, a shunt resistor connected across the current coil, means including a power source for causing a difference current of the standard transformer and a transformer to be tested to flow in the shunt resistor, a phase shifter connected to the power source providing quadrature related voltages, a third transformer and a fourth transformer respectively energized from said phase shifter and having tapped secondaries, the taps of said secondaries being so selected and arranged that in each case one hundred equal steps of voltage are obtainable from each secondary independently; means for applying a desired value of load current to the standard and tested transformer from the power source; a plurality of fixed resistors selectively connected in the circuits of the secondaries of the third and fourth transformers and means for applying their outputs to the current coil along with the difference current, and means for applying one of the quadrature potentials to the potential coil of the detector.

3. Apparatus for testing transformers comprising, in combination: a standard transformer having a secondary winding, terminals for the connection to such apparatus of the secondary winding of a transformer under test, a source of alternating power of nearly constant voltage and variable current for connection to the primary windings of said transformers; a current meter; and circuit connections and switches such that, firstly, the secondary windings of the standard transformer and of the transformer under test may be connected together in series relation and to the meter so that the meter is in parallel relation with both secondary windings whereby either (1) the sum of or (2) the difference of the currents flowing in each of said windings may be applied to the meter to cause it to indicate whether the sum or the difference is so applied with the purpose that the transformer under test be reconnected if necessary for such difference current to flow either through the meter or through another circuit to be substituted for the meter, and such that after establishment of such difference current flow condition, secondly, the meter may be reconnected in series relation with the said secondary windings while maintaining the same polarity relations in the transformers as firstly established, the combination further including a detector having a potential coil and a current coil, a phasing-in resistor and means for connecting the phasing-in resistor in series with the secondary windings as reconnected, and in parallel with the current coil so that a current flows in the current coil which is in phase with the current through the secondary windings; the combination further including phase shifting means having output terminals and having input terminals connected to said source of constant voltage such that the phase relation of voltages at the output terminals may be changed with relation to the voltage of the power source, means for translating the voltage of said output terminals of the phase shifting means to yield two phase-quadrature related compensating voltages whereby the values of the two voltages are fixed in ratio to the voltage of the source and the phase relations of said two quadrature related voltages with respect to the voltage of the power source is variable and fixed by the phase shifting means, and further connections and switching means such that one of said quadrature related voltages may be applied to the potential coil of the detector and the phase shifting means may be adjusted until no deflection of the detector pointer occurs, thereby establishing that one of the quadrature voltages is in phase quadrature with the said secondary current, said circuit connections and switching means further providing for, thereupon, thirdly, reestablishing the circuit relationship firstly achieved except with the current coil substituted in the circuit for the current meter and the difference current flows only through the current coil; said combination further including devices, circuit conductors, and switches for establishing two separately energized compensating circuits in parallel relation to the current coil, such devices including a distinct compensating transformer for impressing energy in each compensating circuit, said compensating transformers having primary windings respectively connected for energization by said quadrature related compensating voltages and said secondary windings having a plurality of taps, such devices further including tap selector contact arms for contacting the taps, each secondary winding and contact arm being so related to the other devices, conductors, and switches in its compensating circuit that several values of compensating voltage may be chosen for impressing in said circuit, certain of said switches being reversing switches connected for reversal of the direction of application of such compensating voltages, said devices further including two groups of compensating current determining resistors, each group of resistors being provided with means arranged and connected for the selection of one of its resistors in one of the compensating circuits and each resistor being proportioned with respect to the compensating voltage of its circuit so that a certain known value of compensating current is caused to flow in said path by the associated compensating transformer when the contact arm is on a certain tap, marks associated with said taps for indicating the value of the error corresponding to such current, and marks associated with the reversing switches for indicating the sense of the errors.

4. Apparatus for testing transformers comprising, in combination: a standard transformer having a secondary winding, terminals for the connection to such apparatus of the secondary winding of a transformer under test, a source of alternating power of nearly constant voltage and variable current for connection to the primary windings of said transformers, a current meter, and circuit connections and switches such that firstly, the secondary windings of the standard transformer and of the transformer under test may be connected together in series relation and to the meter so that it is in parallel relation with both secondary windings whereby either (1) the sum or (2) the difference of the currents flowing in each of said windings may be applied to the meter to cause it to indicate whether the sum or the difference is so applied with the purpose that the transformer under test be reconnected if necessary for such difference current to flow either through the meter or through another circuit to be substituted for the meter, and such that after establishment of such difference current flow condition, secondly, the meter may be reconnected in series relation with the said secondary windings while maintaining the same polarity relations in the transformers as firstly established, the combination further as a detector having a current coil adapted for substitution for the meter as firstly connected, means for measuring the two components of the difference current which are, respectively, in phase and in phase-quadrature, with the concurrent value of the primary current, said means comprising two distinct calibrated sources of current arranged in parallel relation to the current coil and adapted for adjustment to divert the difference current from the path through the current coil.

5. Apparatus for testing current transformers for errors comprising, in combination: means for connecting the transformers under test and a transformer of standardising character with their primary windings and secondary windings respectively in series circuit relation in such polarity arrangement that the ratio of the primary current to the secondary current in each transformer is about the same as the corresponding current ratio is for the standard transformer if it is carrying the same primary current and its secondary winding is short circuited, a resistor of such impedance that, when connected in series in the secondary circuit of said two transformers it produces no substantial error effect in said transformers, and means for connecting said resistor in said series connected secondary circuit; a source of alternating current, means for translating current from said source to the primary windings of said transformers, means for translating energy from said source to produce a compensating current voltage in phase with the current through the resistor; means for connecting the secondary windings in series relation with their secondary currents as before, means providing an additional path for a difference current to flow between the terminii of the secondary windings, and means for measuring out a compensating current from said compensating voltage source in parallel with the additional path equal to the difference current.

6. Apparatus for measuring the ratio error of a transformer having presumably a phase angle error comprising, in combination: means for separating a portion of the secondary current of said transformer from the secondary current which separated portion contains a ratio error component representing the ratio error; a detecting instrument having two coils which when both coils carry currents having in-phase components cause a deflection in said instrument, means for causing a current in phase with the secondary current of the transformer to flow in one of the coils of the detector, means for causing the ratio component to flow in the other coil of the detector thereby causing a deflection of the detector, generating means for generating a compensating current connected in circuit with said other coil adjustable to divert the ratio component from the path through the said other coil thereby causing a zero deflection, and means associated with the generating means for indicating the value of the ratio error upon occurrence of the zero deflection.

7. Apparatus for measuring the ratio error of a transformer having presumably a phase angle error comprising, in combination: means for separating a portion of the secondary current of said transformer from the secondary current which separated portion contains a ratio component and presumably a phase angle component; a detecting instrument having two coils which when both coils carry currents having in-phase components cause a deflection in said instrument, means for causing a current in phase with the secondary current to flow in one of the coils of the detector, means for causing the ratio component to flow in the other coil of the detector thereby causing a deflection, auxiliary current generating means for generating a compensating current connected in circuit with said other coil and adapted for adjustment to a value sufficient to divert all of the ratio component from its path through said other coil thereby to cause a zero deflection, and means associated with the adjustment of said generating means indicating the value of the ratio error upon the event of such zero deflection.

8. Apparatus for measuring the ratio error of a transformer having presumably a phase angle error comprising, in combination: means for separating a portion of the secondary current of said transformer from the secondary current which separated portion contains a ratio component and presumably a phase angle component; a detecting instrument having two coils which when both coils carry currents having in-phase components cause a deflection in said instrument, means for causing a current in phase with the secondary currents to flow in one of the coils of the detector, means for causing the ratio component to flow in the other coil of the detector thereby causing a deflection, and auxiliary current generating means for generating a compensating current connected in circuit with said other coil and adapted for adjustment to a value sufficient to divert all of the ratio component from its path through said other coil thereby to cause a zero deflection.

9. Apparatus for measuring the phase angle error of a transformer having presumably a ratio error comprising, in combination: means for separating a portion of the secondary current of said transformer from the secondary current which separated portion contains a phase angle component and presumably a ratio component; a detecting instrument having two coils which when both coils carry currents having in-phase components cause a deflection in said instrument, means for causing a current in phase quadrature with the secondary current to flow in one of the coils of the detector, means for causing the phase angle component to flow in the other coil of the detector thereby causing a deflection, and auxiliary current generating means for generating a compensating current connected in circuit with said other coil thereby to cause a zero deflection, and means associated with the adjustment of said generating means indicating the value of the phase angle error upon the event of such zero deflection.

10. Apparatus for measuring the phase angle error of a transformer having presumably a ratio error comprising, in combination: means for separating a portion of the secondary current of said transformer from the secondary current which separated portion contains a phase angle component and presumably a ratio component; a detecting instrument having two coils which when both coils carry currents having in phase components cause a deflection in said instrument, means for causing a current in phase quadrature with the secondary current to flow in one of the coils of the detector, means for causing the phase angle component to flow in the other coil of the detector thereby causing a deflection, and auxiliary current generating means for generating a compensating current connected in circuit with said other coil and adapted for adjustment to a value sufficient to divert all of the phase angle component from its path through said other coil thereby to cause a zero deflection of said detecting instrument.

11. Apparatus for measuring the errors of a transformer comprising, in combination: means for separating a portion of the secondary current of said transformer from the secondary current which separated portion produces the error; a deflection detecting instrument having two coils which when both coils carry currents having in-phase components cause a deflection in the instrument, means for causing a current in phase with the secondary currents to flow in one of the coils of the detector, means for causing the separated portion of the secondary current to flow in the other coil of the detector thereby causing a deflection, and auxiliary current generating means for generating a compensating current connected in circuit with said other coil and adapted for adjustment to a value sufficient to divert all of the error producing current from its path through said other coil thereby to cause a zero deflection.

12. Apparatus for comparing a standard transformer with a transformer under test of the same nominal ratio comprising, in combination: means including a voltage supply for causing the passage of the same value of current through the primary windings with the secondary windings connected together to circulate a current having the ratio to the primary current equal to the ratio of the standard transformer, means providing for a bridging current path between the terminals of the secondary windings including a detector coil, and means providing for an additional current path between the terminals of the secondary windings including a resistor and a source of variable voltage, said variable voltage source being energized by said voltage supply, whereby upon varying said variable voltage the current in said bridging path is altered in the same ratio as the variation of the voltage irrespective of the alteration of the supply voltage.

13. Apparatus for comparing a standard transformer with a transformer under test of the same nominal ratio comprising, in combination: means including a voltage supply for causing the passage of the same current through the primary windings with the secondary windings connected together to circulate a current having the ratio to the primary current about equal to the ratio of the standard transformer, means providing for a difference current path between the terminals of the secondary windings including a detector coil, means providing for an additional current path between the terminals of the secondary windings including a source of variable voltage, means providing for energizing said variable voltage source from said voltage supply, whereby upon varying said variable voltage the current in said difference current path is altered in the same ratio as the variation of the voltage irrespective of the alteration of the supply voltage, and means associated with said detector for indicating presence and absence of current in said difference current path.

14. Apparatus for comparing a standard transformer with a transformer under test comprising, in combination: means including a voltage supply of substantially constant voltage for causing the passage of the same current through the primary windings with the secondary windings connected together to circulate a current having the ratio to the primary current about equal to the nominal ratio of the standard transformer, means providing for a difference current path between the terminals of the secondary windings including a source of variable voltage, and means providing for energizing said variable voltage source by said voltage supply.

15. Apparatus for comparing a standard transformer with a transformer under test of the same nominal ratio comprising, in combination: means including a voltage supply for causing the passage of the same current through the primary windings with the secondary windings connected together to circulate a current having the ratio to the primary current equal to the ratio of the standard transformer, means providing for a difference current path between the terminals of the secondary windings including a detector coil, and means providing for a second current path between the terminals of the secondary windings including a source of variable voltage, said variable voltage source being energized by said voltage supply and including means indicating the proportion of the difference current passing therethrough.

16. Means for measuring error components of current in apparatus which produces such error current components in response to the application of alternating current to the apparatus, comprising means for providing a branch circuit for the error component to flow through, means for causing the error component to flow in that branch circuit; a source of alternating current applied to said apparatus for producing the current and its error component; means providing two additional circuit paths in parallel with the branch circuit including two sources of voltage arranged for the concurrent provision of quadrature related voltages for application respectively in the additional paths; means for energizing the quadrature related voltage sources with a voltage in proportion to the voltage of the source of alternating current, means for varying the quadrature related voltages produced in said paths until no current flows in the branch circuit; and means associated with said varying means for indicating the errors of such apparatus in terms of said error component and current.

17. Means for measuring error components of current in apparatus which produces such error current components in response to the normal application of alternating current to the apparatus, comprising: means providing a branch circuit for the error component to flow through, means for causing the error component to flow in the branch circuit; a source of alternating current energy applied to said apparatus for producing the current and its error component; means providing an additional circuit path in parallel with the branch circuit including a second source of alternating current energy arranged for application of its output voltage in the additional path; means for energizing the second source to produce a voltage active in said path in proportion to the voltage of the first mentioned source, means for varying the voltage of the second source to alter the current flow of the branch circuit; and means for indicating the value of current diverted from the branch circuit by said second source.

18. Means according to claim 17, and means for adjusting the phase relation of the voltage of the second source with respect to the voltage of the first source.

19. Means according to claim 18, said additional circuit path including a resistor for determining the current flow in said path.

20. Means according to claim 17, and means including a plurality of different resistors for selective inclusion in said path to vary the current flow in response to any particular voltage of said second source.

21. Means for measuring error components of current in apparatus which produces such error current components in response to the normal application of alternating current to the apparatus, comprising means providing a branch circuit for the error component to flow through, means for causing the error component to flow in that branch circuit; a source of alternating current energy applied to said apparatus for producing the current and its error component; means providing an additional circuit path in parallel with the branch circuit including a second source of alternating current energy arranged for application of its output voltage in the additional path; means for energizing the second source to produce a voltage active in said path in proportion to the voltage of the first mentioned source, means including a resistor for determining the current flow in said path, and means for indicating the portion of current diverted from the branch circuit.

22. Apparatus for comparing a standard transformer with a transformer under test comprising, in combination: means including a voltage supply of unsubstantially fluctuating voltage for causing the passage of the same current through the primary windings with the secondary windings connected together to circulate a current having the ratio to the primary current about equal to the nominal ratio of the standard transformer, means providing for a difference current circuit including the terminals of the secondary windings and including a source of a variable voltage, means providing for energization of said variable voltage source in proportion to the voltage of said voltage supply; and means including an indicator, a resistor, and a phase shifter for determining a phase relation between such difference current and the variable voltage.

23. Means for measuring error components of current in apparatus which produces such error current components in response to the application of alternating current to the apparatus, comprising means providing a branch circuit for the error component to flow through, means for causing the error component to flow in that branch circuit; a source of alternating current applied to said apparatus for producing the current and its error component; means providing two additional circuit paths in parallel with the branch circuit including two sources of voltage arranged for the concurrent provision of quadrature related voltages for application respectively to the additional paths; means for energizing the quadrature related sources with a voltage in proportion to the voltage of the source of alternating current; means including an indicator, a resistor, and a phase shifter for determining a phase relation between such difference current and the source of quadrature voltages, means for varying the quadrature related voltages produced in said paths until no current flows in the branch circuit; and means associated with said varying means for indicating the errors of such apparatus in terms of said error component and current.

24. Means for measuring error components of current in apparatus which produces such error current components in response to the normal application of alternating current to the apparatus, comprising means providing a branch circuit for the error component to flow through, means for causing the error component to flow in the branch circuit; a source of alternating current energy applied to said apparatus for producing the current and its error component; means providing an additional circuit path in parallel with the branch circuit including a second source of alternating current energy arranged for application of its output voltage in the additional path; means for energizing the second source to produce a voltage active in said path in proportion to the voltage of the first mentioned source, means for varying the voltage of the second source to alter the current flow of the branch circuit; means including an indicator, a resistor, and a phase shifter for determining a phase relation between said difference current and the second source of alternating current; and means for indicating the value of current diverted from the branch circuit by said second source.

25. In apparatus for measuring error current characteristics of a transformer while the transformer is connected to a transformer which it is compared to, a resistor of such low resistance value that upon connection in the secondary circuits of said transformers it imposes only a negligible burden thereon, means for connecting the resistor in the secondary circuits of said transformers, a detector having a current coil and a voltage coil, means for connecting the current coil to the resistor, a source of alternating energy, means for applying the source to the primary windings of the transformers, an adjustable phase phase shifter, and means connecting the phase shifter to said source of energy and to said voltage coil so that the phase of the output of the phase shifter may be determined with reference to the secondary current of said transformer.

26. In the measurement of instrument errors the method of establishing a certain phase relation between a first current and a second current which comprises, including in the path of the first current a low value of resistance to cause a potential drop therein of very small value substantially in phase with the first current, causing this potential to be applied to one coil of a two coil detector, and causing the other coil to be energized by the second current, and adjusting the phase of the second current until no deflection exists in the detector.

27. Apparatus for testing transformers comprising, in combination: a standard transformer, a detector having a current coil with two terminals and a potential coil; a shunt resistor having two terminals and means for connecting and disconnecting the two terminals of the shunt resistor to and from the two terminals of the current coil; a current meter; means, including a power source of substantially constant voltage, for producing and causing either (1) a resultant current of the standard transformer and a transformer to be tested, both transformers being then connected in series additive relation with each other and in series with the shunt resistor, or (2) a difference current, the standard transformer and the transformer under test being then connected in series additive relation and the shunt resistor being connected to both terminals of both transformers, to flow through the shunt resistor; means including a phase shifter connected to the power source providing quadrature related constant output voltages having variable phase with respect to the source voltage, a third transformer and a fourth transformer respectively energized from and at the output voltages of said phase shifter and having tapped secondaries, the taps of said secondaries being so selected and arranged that in each case one hundred equal steps of voltage are obtainable from each secondary independently; means for applying a desired predetermined value of load current to the standard and tested transformer from the power source; a plurality of fixed resistors selectively connectable to the various tap circuits of the secondaries of the third and fourth transformers and means for completing circuits with certain of these various resistor and tap circuits in circuit with the current coil; means for concurrently applying a difference current from the standard transformer and the transformer under test to the current coil with the shunt resistor disconnected from the current coil; and means for applying either one of the quadrature potentials derived from the phase shifter to the potential coil of the detector.

28. Apparatus for testing transformers comprising, in combination: a standard transformer; a detector having a current coil and a potential coil; a shunt resistor and means for connecting and disconnecting the shunt resistor to and from the current coil; a current meter; means, including a source of alternating current constant voltage, for producing and causing either (1) a resultant current of the standard transformer and a transformer to be tested, both transformers being then connected in series additive voltage relation with each other and in series with the shunt resistor and the current meter, or (2) a difference current, the standard transformer and the transformer under test being then connected in series additive voltage relation and the shunt resistor being connected to both terminals of both transformers, to flow through the shunt resistor; means, including a phase shifter connected to the power source, for providing quadrature related constant output voltages having variable phase with respect to the source voltage; and means for applying either one of the quadrature voltages derived from the output of the phase shifter to the potential coil of the detector.

29. Apparatus for testing transformers comprising, in combination: a standard transformer; a detector having a current coil and a potential coil; a shunt resistor and means for connecting and disconnecting the shunt resistor to and from the current coil; a current meter; means, including a source of alternating current constant voltage, for producing and causing either (1) a resultant current of the standard transformer and a transformer to be tested, both transformers being then connected in series additive voltage relation with each other, to flow in series with the current meter, or (2) a difference current, the standard transformer and the transformer under test being then connected in series additive voltage relation and the shunt resistor being connected to both terminals of both transformers, to flow through the shunt resistor with the current coil connected to the resistor; means including an adjustable phase phase shifter connected to the power source, for providing quadrature related constant output voltages having variable phase with respect to the source voltage; and means for applying one of the quadrature potentials derived from the output of the phase shifter to the potential coil of the detector while adjusting the phase of the phase shifter whereby the detector produces zero deflection when the potential applied thereby to the detector coil is actually in phase quadrature relation to the difference current in the current coil.

30. Apparatus for testing transformers comprising, in combination: a standard transformer; a detector having a current coil and a potential coil capable of deflection of its pointer when in-phase components of alternating currents are applied to the coils; a shunt resistor and means for connecting and disconnecting the shunt resistor to and from electro-conductive relation with the current coil; means, including a source of alternating current and voltage, for producing and causing a difference current, the standard transformer and the transformer under test being then connected in series additive voltage relation and the shunt resistor being connected to both terminals of both transformers, to flow from both transformers through the shunt resistor with the current coil connected to the resistor; means including an adjustable phase phase shifter connected to the power source, for providing output voltages having variable phase with respect to the source voltage; and means for applying voltage derived from the output of the phase shifter to the potential coil of the detector while adjusting the phase of the phase shifter whereby the detector produces zero deflection when the potential applied thereto by the phase shifter is actually in phase quadrature relation to the difference current in the current coil.

31. Apparatus for testing transformers comprising, in combination: a standard transformer; a detector having a current coil and a potential coil capable of deflection of its pointer when in-phase components of alternating currents are applied to the coils; a shunt resistor and means for connecting and disconnecting the shunt resistor to and from electro-conductive relation with the current coil; a current meter; means, including a source of alternating current and constant alternating voltage, for producing and causing a difference current, the standard transformer and the transformer under test being then connected in series additive voltage relation and the shunt resistor being connected to both terminals of both transformers, to flow from both transformers through the shunt resistor with the current coil connected to the resistor; means including an adjustable phase phase shifter connected to the power source, for providing two quadrature related output voltages having variable phase with respect to the source voltage; means for applying voltage derived from the output of the phase shifter to the potential coil of the detector while adjusting the phase of the phase shifter whereby the detector produces zero deflection of its pointer when the potential applied thereto by the phase shifter is actually in phase quadrature relation to the difference current in the current coil; and means, including the detector and responsive to energy derived from the two quadrature related output voltages, for measuring quadrature and in-phase components of current flowing in the current coil of the detector.

OTTO A. KNOPP.

References Cited in the file of this patent

UNITED STATES PATENTS

| Number | Name | Date |
| --- | --- | --- |
| 530,597 | Meston | Dec. 11, 1894 |
| 1,395,306 | Strok | Nov. 1, 1921 |
| 1,550,906 | Knopp | Aug. 25, 1925 |
| 1,588,539 | Fortescue | June 15, 1926 |
| 1,778,832 | Liwschitz | Oct. 21, 1930 |
| 1,795,607 | Keinath et al. | Mar. 10, 1931 |
| 1,815,217 | Shotter | July 21, 1931 |
| 1,819,714 | Knopp | Aug. 18, 1931 |
| 1,972,243 | Nolke | Sept. 4, 1934 |
| 2,410,386 | Miller | Oct. 29, 1946 |

OTHER REFERENCES

The Electrical Review, August 7, 1933, pp. 480–481.

Journal Instit. Electrical Engineers, 91, Part II, pp. 177–184, June 1944.